United States Patent
Whitehouse et al.

(10) Patent No.: US 12,122,290 B2
(45) Date of Patent: Oct. 22, 2024

(54) APPARATUS AND METHODS FOR PARKING ASSISTANCE

(71) Applicant: JAGUAR LAND ROVER LIMITED, Coventry (GB)

(72) Inventors: Stuart Whitehouse, Warwickshire (GB); Ruben Gomez Padin, Warwickshire (GB); Ilias Aitidis, Warwickshire (GB); Sean Emson, Warwickshire (GB); Thai Hai Pham, Mahwah, NJ (US); Matt Mercer, Mahwah, NJ (US); Ivan Epling, Mahwah, NJ (US)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/110,951

(22) Filed: Dec. 3, 2020

(65) Prior Publication Data

US 2022/0176876 A1 Jun. 9, 2022

(51) Int. Cl.
*B60Q 1/50* (2006.01)
*B60Q 1/24* (2006.01)
*G06T 11/00* (2006.01)

(52) U.S. Cl.
CPC ............... *B60Q 1/50* (2013.01); *B60Q 1/24* (2013.01); *G06T 11/00* (2013.01); *B60Q 2400/50* (2013.01)

(58) Field of Classification Search
CPC ........ B60Q 1/50; B60Q 1/24; B60Q 2400/50; G06T 11/00; G08G 1/168; B60W 30/06
See application file for complete search history.

(56) References Cited

U.S. PATENT DOCUMENTS

| | | | |
|---|---|---|---|
| 6,703,944 B1* | 3/2004 | Obradovich | G01C 21/26 367/101 |
| 10,195,980 B2* | 2/2019 | Widdowson | B60Q 1/0011 |
| 2009/0066811 A1* | 3/2009 | Maekawa | H04N 5/772 348/E9.002 |
| 2010/0070139 A1* | 3/2010 | Ohshima | B62D 15/028 701/42 |
| 2010/0283632 A1* | 11/2010 | Kawabata | G08G 1/165 340/932.2 |
| 2015/0294166 A1* | 10/2015 | Kuehnle | B60Q 9/007 382/104 |
| 2016/0351051 A1* | 12/2016 | Murthy | G06V 20/588 |
| 2018/0050637 A1* | 2/2018 | Tan | B60R 1/27 |
| 2019/0100245 A1* | 4/2019 | Fukushima | B60W 50/085 |

(Continued)

*Primary Examiner* — Michael Le
(74) *Attorney, Agent, or Firm* — McCoy Russell LLP

(57) ABSTRACT

Aspects of the present invention relate to a control system (110) for a vehicle (200, 300), the control system comprising one or more controller, the one or more controller comprising an electrical input (140) arranged to receive image data (165) from one or more imaging devices (160), the image data indicative of an environment external to the vehicle (200, 300), a processor (120) arranged to generate one or more graphical indicators, each graphical indicator representing an extent of a projection (230, 310) from the vehicle into the environment external to the vehicle, wherein the extent of the projection is not visible in the image data, and an electrical output (150) arranged to output augmented image data comprising the image data and data indicative of the one or more graphical indicators for display on a display device.

13 Claims, 8 Drawing Sheets

(56) References Cited

U.S. PATENT DOCUMENTS

| | | | | |
|---|---|---|---|---|
| 2019/0162545 | A1* | 5/2019 | Greenwood | G01C 21/3407 |
| 2019/0166338 | A1* | 5/2019 | Greenwood | G06V 20/56 |
| 2019/0184983 | A1* | 6/2019 | Tada | B60W 30/06 |
| 2019/0225154 | A1* | 7/2019 | Ionascu | G06F 18/256 |
| 2020/0320676 | A1* | 10/2020 | Hardy | G08G 1/09623 |
| 2021/0118299 | A1* | 4/2021 | Yata | B62D 6/00 |

* cited by examiner

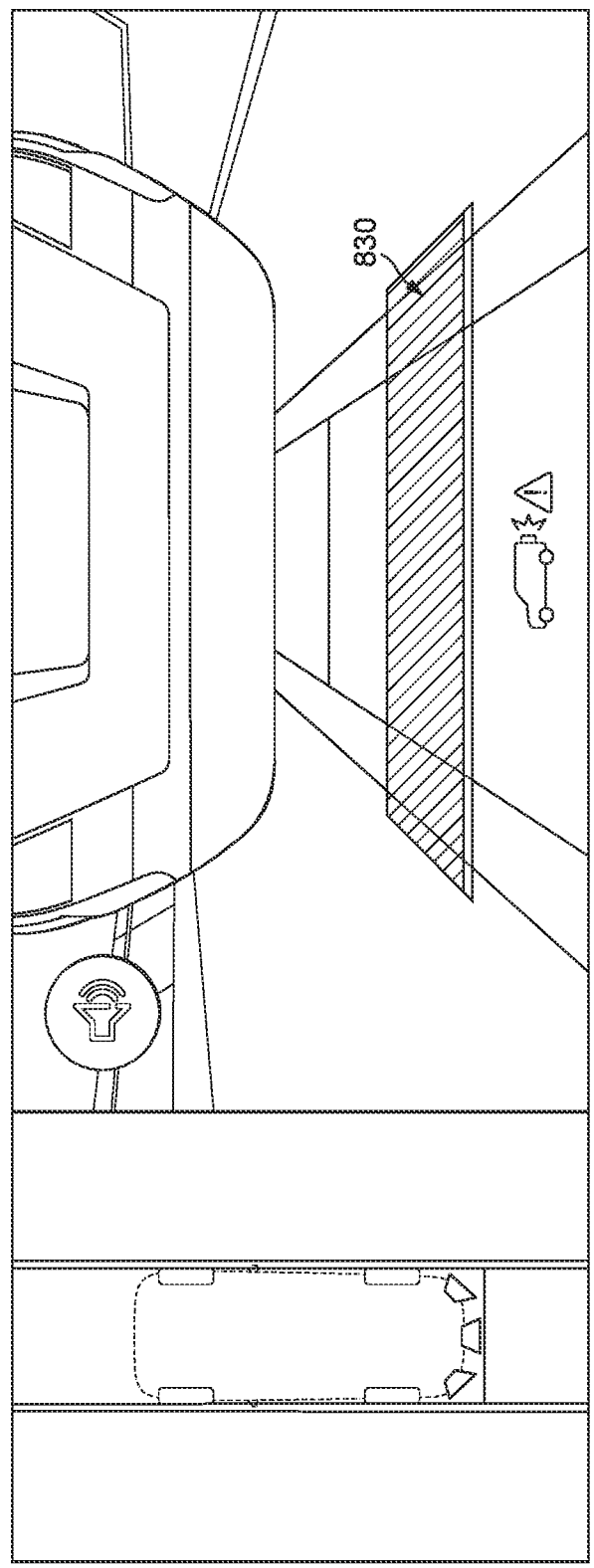

APPARATUS AND METHODS FOR PARKING ASSISTANCE

TECHNICAL FIELD

The present disclosure relates to providing parking assistance for a vehicle. Aspects of the invention relate to a control system, a system, a vehicle, a method and to computer software.

BACKGROUND

It is known for vehicles to provide parking assistance in the form of a display within the vehicle showing images external to the vehicle obtained from one or more imaging devices. The display enables a driver of the vehicle to be made aware of objects in an environment of the vehicle particularly whilst performing a parking or other low-speed manoeuvre of the vehicle. However, problems have been observed that due to a location of an imaging device about the vehicle, the image data can be misleading to the driver. An imaging device, such as at a rear of a vehicle, may be mounted in a relatively low position about the vehicle, such as in a region of a bumper or number plate of the vehicle. This may cause the image data obtained therefrom to misrepresent large objects, such as other vehicles, which may also be compounded by the imaging device having a lens with a wide viewing angle, creating a large amount of fish-eye in the image data. It has also been observed that it is necessary for drivers of some vehicles to judge an appropriate parking distance from such objects.

It is an aim of the present invention to address one or more of the disadvantages associated with the prior art.

SUMMARY OF THE INVENTION

Aspects and embodiments of the invention provide a control system, a system, a vehicle, a method and computer software as claimed in the appended claims According to an aspect of the present invention there is provided a control system for a vehicle, the control system comprising one or more controller, the one or more controller comprising an electrical input arranged to receive image data from one or more imaging devices, the image data indicative of an environment external to the vehicle, a processor arranged to generate one or more graphical indicators, each graphical indicator representing an extent of a projection from the vehicle into the environment external to the vehicle, an electrical output arranged to output augmented image data comprising the image data and data indicative of the one or more graphical indicators for display on a display device.

According to an aspect of the invention, there is provided a control system for a vehicle, the control system comprising one or more controller, the one or more controller comprising an input means arranged to receive image data from one or more imaging means, the image data indicative of an environment external to the vehicle, a processing means arranged to generate one or more graphical indicators, each graphical indicator representing an extent of a projection from the vehicle into the environment external to the vehicle, wherein the extent of the projection is not visible in the image data, an output means arranged to output augmented image data comprising the image data and data indicative of the one or more graphical indicators for display on a display means.

According to another aspect of the invention, there is provided a control system for a vehicle, the control system comprising one or more controller, the one or more controller comprising an electrical input arranged to receive image data from one or more imaging devices, the image data indicative of an environment external to the vehicle, a processor arranged to generate one or more graphical indicators, each graphical indicator representing an extent of a projection from the vehicle into the environment external to the vehicle, wherein the extent of the projection is not visible in the image data, an electrical output arranged to output augmented image data comprising the image data and data indicative of the one or more graphical indicators for display on a display device. Advantageously the one or more graphical indicators enable the extent of the projection which is not visible in the image data to be appreciated for maneuvering the vehicle.

The control system may comprise a memory means or memory device arranged to store computer-readable instructions which, when executed by the processor, cause the processor to perform steps of generating one or more graphical indicators, each graphical indicator representing an extent of a projection from the vehicle into the environment external to the vehicle, wherein the extent of the projection is not visible in the image data.

The projection, or moveable projection, may not be not visible in the image data. Advantageously, providing the graphical indicator enables consideration of the projection, or moveable projection when maneuvering the vehicle. The projection may be an actual or possible projection. Advantageously the projection may be possible in that it may not project at a time of maneuvering the vehicle. The extent of the projection may be invisible in the image data.

The projection may be a moveable projection moveable between a retracted position and an extended position. Advantageously projections which have various or multiple extensions may be considered.

The graphical indicator may be indicative of the extent of the moveable projection in the retracted position. Advantageously the retracted extent of the projection may be indicated to the driver. The graphical indicator is indicative of the extent of the moveable projection in the extended position. Advantageously the extended extent of the projection may be indicated to the driver.

The moveable projection is optionally an aperture closing member for closing an aperture of the vehicle in the retracted position. Advantageously the extent of aperture closing members may be indicated. The extent of the aperture closing member may be in an open position. In the extended position the aperture closing member may allow access to an interior of the vehicle. The aperture closing member may be one of a door, a tailgate and a hatch opening. Advantageously an extent of a variety of aperture closing members may be indicated.

The electrical input may be arranged to receive distance data indicative of a distance between the vehicle and an object in the environment external to the vehicle. Advantageously the control system may be provided with distance data in dependence on which the graphical indicator may be generated.

The processing means may be arranged generate at least one of the one or more graphical indicators indicative of the distance between the extent of the projection and the object. Advantageously the distance may be graphically indicated.

The processing means is optionally arranged to generate the one or more graphical indicators having one or more attributes indicative of the distance between the extent of the projection and the object. Advantageously the one or more attributes indicate the distance to the driver of the vehicle.

The processing means may be arranged to select one or more of a plurality of predetermined regions, each region being associated with a respective projection. The one or more regions may be selected in dependence on the distance between the extent of the projection and the object. The one or more selected regions may be graphically indicated. Advantageously the parking aid display conveniently indicates the region corresponding to the location of the object, which may rapidly provide information to the driver.

The selective indication optionally comprises a highlighting applied to a portion of the image data corresponding to the one or more of the plurality of predetermined regions. Advantageously a region of the image data is indicated corresponding to the location of the object, which may be easily appreciated by the driver. One or more attributes of the highlighting may comprise one or more of a transparency or a colour associated with the graphical indicator. Advantageously the one or more attributed may be controlled to provide the indication.

The processing means may be arranged to generate a graphical icon in dependence on the distance between the extent of the projection and the object. Advantageously the icon may provide an indication of the nature of the projection and the distance.

Optionally, highlighting associated with the graphical indicator may be arranged to extend from an origin corresponding to the extent of the projection from the vehicle in a direction toward the object. Optionally one or more attributes comprise an extent of the graphical indicator.

The one or more attributes may comprise a transparency of the graphical indicator The graphical indicator is arranged generally perpendicular to at least one indication of a path of the vehicle. Advantageously the parking aid indicates the extent of the projection in relation to the path.

According to another aspect of the invention, there is provided a system for a vehicle, comprising a control system as described above, one or more imaging devices for outputting image data to the control system, and a display device for outputting thereon augmented image from the control system.

The system optionally comprises one or more devices for determining a distance to an object and outputting distance data indicative thereof to the control system.

The one or more devices may comprise one or more of ultrasonic devices, radar devices and imaging devices.

According to yet another aspect of the invention, there is provided a vehicle comprising a control system as described above or a system as described above.

According to still further aspect of the invention, there is provided a computer-implemented method, comprising receiving image data from one or more imaging devices, the image data indicative of an environment external to a vehicle, generating one or more graphical indicators, each graphical indicator representing an extent of a projection from the vehicle, wherein the extent of the projection is not visible in the image data, and displaying on a display device augmented image data comprising the image data and the one or more graphical indicators.

The method optionally comprises determining a distance between the vehicle and an object in the environment external to the vehicle.

The method optionally comprises displaying at least one of the one or more graphical indicators indicative of the distance between the extent of the projection and the object.

The method may comprise displaying one or more graphical indicators having one or more attributes indicative of the distance between the extent of the projection and the object.

The one or more attributes optionally comprise highlighting associated with the graphical indicator. The highlighting associated with the graphical indicator may be arranged to extend from an origin corresponding to the extent of the projection from the vehicle in a direction toward the vehicle. Optionally the graphical indicator is arranged generally perpendicular to at least one indication of a path of the vehicle.

According to still further aspect of the invention, there is provided computer software which, when executed by a computer, is arranged to perform a method as described above. Optionally the computer software is stored on a computer readable medium. The computer software may be tangibly stored on the computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

The, or each, electronic processor may comprise any suitable electronic processor (e.g., a microprocessor, a microcontroller, an ASIC, etc.) that is configured to execute electronic instructions. The, or each, electronic memory device may comprise any suitable memory device and may store a variety of data, information, threshold value(s), lookup tables or other data structures, and/or instructions therein or thereon. In an embodiment, the memory device has information and instructions for software, firmware, programs, algorithms, scripts, applications, etc. stored therein or thereon that may govern all or part of the methodology described herein. The processor, or each, electronic processor may access the memory device and execute and/or use that or those instructions and information to carry out or perform some or all of the functionality and methodology describe herein.

The at least one memory device may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers have been described comprising at least one electronic processor configured to execute electronic instructions stored within at least one memory device which when executed causes the electronic processor(s) to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

BRIEF DESCRIPTION OF THE DRAWINGS

One or more embodiments of the invention will now be described, by way of example only, with reference to the accompanying drawings, in which:

FIGS. 8a and 8b show a still further parking aid display according to an embodiment of the present invention.

DETAILED DESCRIPTION

Figure 1:
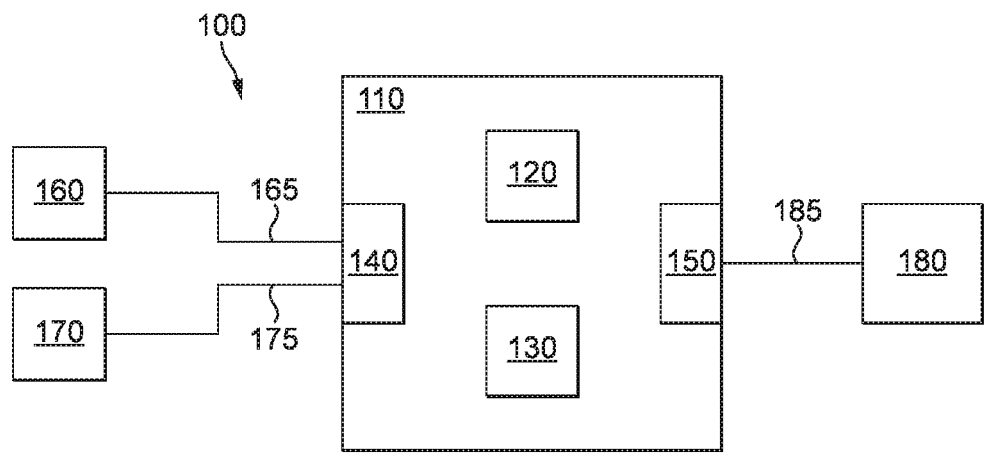
FIG. 1 shows a system according to an embodiment of the invention.

FIG. 1 illustrates a system 100 according to an embodiment of the present invention. The system is a parking aid system 100 for a vehicle, such as a vehicle 200, 300 illustrated in FIG. 2 or 3. The parking aid system 100 comprises one or more sensors 160, 170, a control system 110 and an output device in the form of a display device 180 or display 180.

The control system 110 comprises processing means 120 and memory means 130. The processing means 120 may be one or more electronic processing devices 120 or processors 120 which operably execute computer-readable instructions. The memory means 130 may be one or more memory devices 130, hereinafter memory 130. The memory 130 is electrically coupled to the processor 120. The memory 130 is configured to store instructions, and the processor 111 is configured to access the memory 130 and execute the instructions stored thereon. The control system 110 comprises an input means 140 which is an electrical input to the control system 110 to receive one or more electrical signals representing data. The control system 110 comprises an output means 150 which is an electrical output 150 from the control system 110 to output one or more electrical signals representing data. The output 150 is arranged to output image data which, as will be explained, comprises augmentation to assist maneuvering the vehicle 200, 300.

The control system 110 is communicably coupled to one or more sensors 160, 170 associated with the vehicle 200, 300. The sensors 160, 170 comprises one or more imaging devices 160 such as one or more cameras 160. In particular, in embodiments of the invention, the camera 160 may be arranged about a rear of the vehicle 200, 300 as a rear-view camera, although embodiments of the invention are not be limited in this respect i.e. the imaging devices 160 may comprise a forward or side view camera 160. The one or more imaging devices 160 are arranged to output image data 165 to the control system 110.

In some embodiments, the sensors 160, 170 comprises distance measuring means 170 which may be one or more distance measuring devices 170. The one or more distance measuring devices 170 are arranged to output distance data indicative of a distance between the vehicle (at the point of the respective device), and an object in the environment external to the vehicle 200, 300. The one or more distance measuring devices 170 may comprise an arrangement of a plurality of proximity sensors 170 or sensor devices 170. In some embodiments, a sensing region of each sensor 170 may overlap partially with that of another sensor 170. In some embodiments, the proximity sensors 170 may be arranged on or within a body of the vehicle 200, 300, such as on a bumper of the vehicle 200, 300. The proximity sensors 170 may be arranged at one or both of a front or a rear of the vehicle 200, 300. The proximity sensors 170 may further extend, at least partially, to either side of the vehicle 200, 300. The proximity sensors 170 may be arranged to output radiation and to receive radiation reflected from any objects in the environment of the vehicle 200, 300. In some embodiments, the proximity sensors 170 may be ultrasonic sensing devices 170 although it will be appreciated that embodiments of the invention are not limited in this respect.

Figure 2:
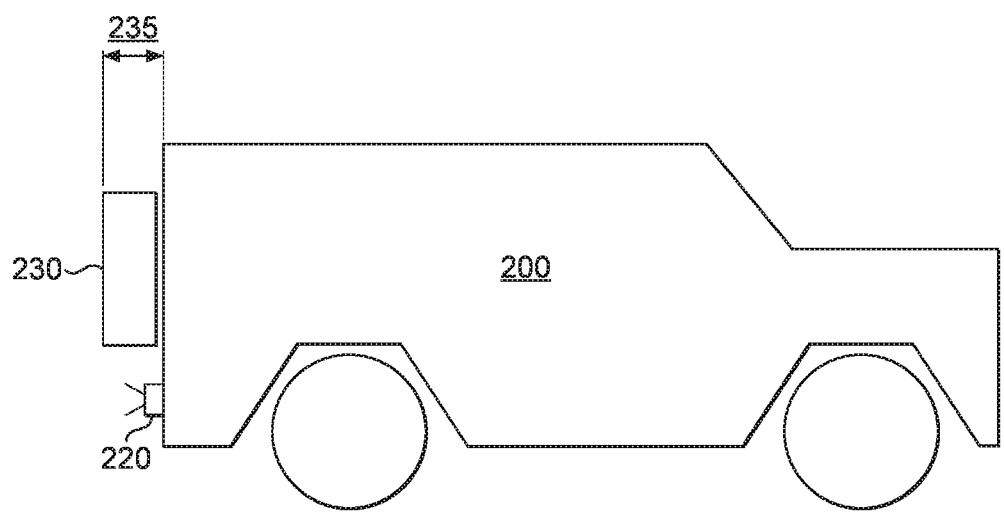
FIG. 2 shows a vehicle according to an embodiment of the invention.
Figure 3:
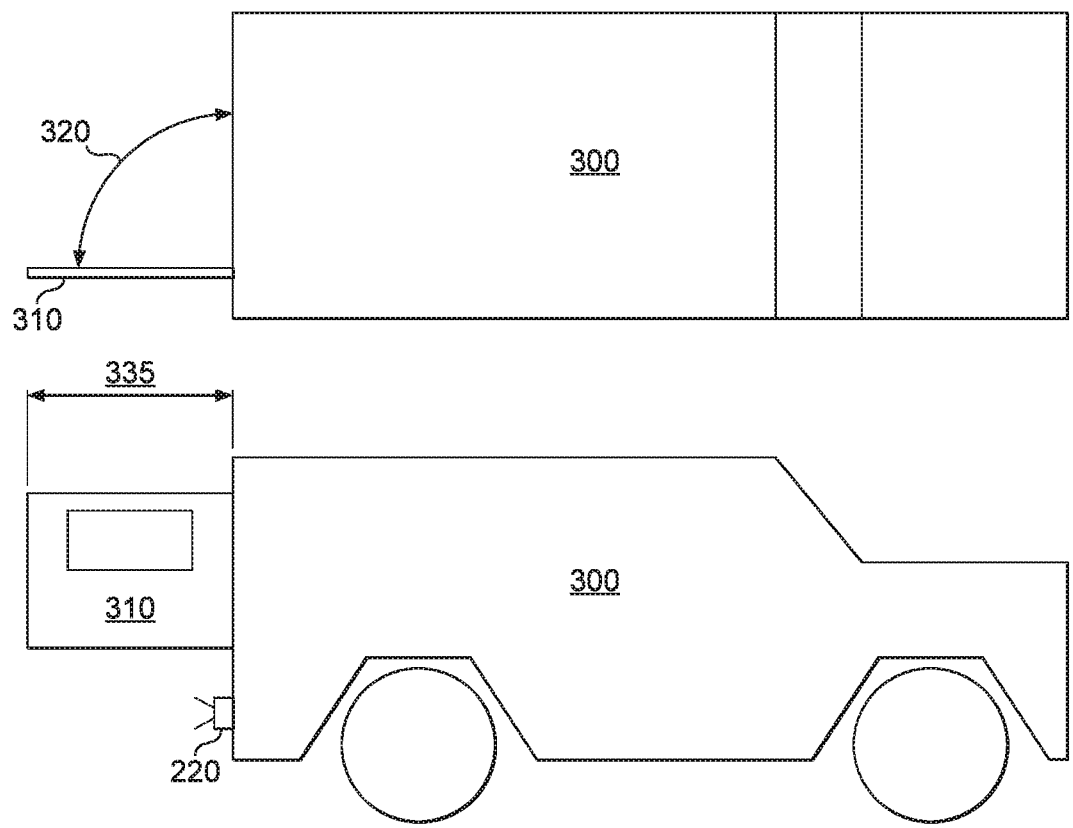
FIG. 3 shows a further illustration of a vehicle according to an embodiment of the invention.

Referring to FIGS. 2 & 3, vehicles 200, 300 in accordance with embodiments of the present invention are shown. Each of the vehicles 200, 300 is equipped with a camera 220 to provide rear-view image data of the vehicle 200, 300 which is useful particularly for reversing the vehicle 200, 300. Images corresponding to the image data from the camera 220 are output on a display 180 within the vehicle 200, 300 to aid the driver in, for example, parking the vehicle 200, 300. Example parking aid displays from the prior art are shown in FIG. 4, as discussed below.

Each of the vehicles 200, 300 comprises a projection 230, 310 from the vehicle 200, 300 into the environment external to the vehicle 200, 300. The projection extends from a rear of the vehicle 200, 300.

Referring to the vehicle 200 illustrated in FIG. 2, the vehicle 200 comprises a projection from a removable accessory 230 mounted upon the vehicle 200. In the illustrated example, the projection is a spare wheel 230 mounted upon a rear of the vehicle 200, such as upon a rear door or other surface of the vehicle 200. It will be realised that the spare wheel 230 is an example of such a projection and that other features providing a projection from a rear of the vehicle 200 may be envisaged, such as cycle carrier racks, water tanks, luggage carriers etc. In some instances, the projection 230 is a removable accessory where removable is understood to mean that the accessory may be removed from the vehicle, such as by hand or using tools such as a wheel brace, spanner, socket or the like. Thus the accessory may not necessarily have been part of the vehicle 200 as manufactured, but added later by a user of the vehicle i.e. to carry additional luggage (such as bags or bicycles), equipment (sand ladders and the like) or supplies (e.g. water). Therefore the projection 230 extends a distance 235 from the rear of the vehicle 200 which may make reversing the vehicle 200, such as during parking, toward another object such as, for example, a wall or another vehicle difficult. The difficulty may occur because an extent of the projections 230 is not visible in the image data from the camera 220.

Referring to FIG. 3, there is illustrated a vehicle 300 with an openable rear door 310. In the example shown in FIG. 3, the door 310 is mounted upon hinges to be moveable between a stored position, where the door is closed, and an open position illustrated in FIG. 3. The door 310 is mounted upon the hinges to swing through an arc 320 between the open and closed positions. As shown, when in the open position the door 310 represents a moveable projection which in one configuration, namely the open configuration shown, projects a distance 335 from the rear of the vehicle 300. Although it is unlikely (although not impossible) that the vehicle 300 will be manoeuvred with the door 310 open, it is desirable that when the vehicle 300 is stopped i.e. parked, it is possible to be able to open the door 310 to its open configuration where the distance 335 from the rear of the vehicle 300 is required to be provided between the vehicle 300 and an object to allow the door 310 to open. Thus the door 310 represents a moveable projection having a retracted position or configuration i.e. where the door 310 is closed and an extended position i.e. where the door 310 is open and thus extends the distance 335 from the vehicle 300. Whilst the door 310 has been described as an example of a moveable projection, other such projections can be envisaged such as, although not exclusively, a tailgate, a hatch opening, a cycle carrier which may be folded against the rear of the vehicle 300 and thus has two configurations comprising the retracted configuration and the extended configuration i.e. where the cycle carrier is folded down or extended from the vehicle 300 to support one or more bicycles. Even in the retracted or folded configuration, the cycle carrier may still represent a projection from the vehicle 300 similar to that shown in FIG. 2. It will also be appreciated that the wheel 230 of FIG. 2 may be mounted upon the door 310. Thus the extent of the projection from the vehicle 300 may vary in different configurations. Another example of a moveable projection is a retractable tow bar which, in a retracted configuration may be withdrawn into or below the vehicle i.e. behind a bumper, and is moveable outward, either manually or automatically, to project from the vehicle in an extended or deployed configuration.

Figure 4A:
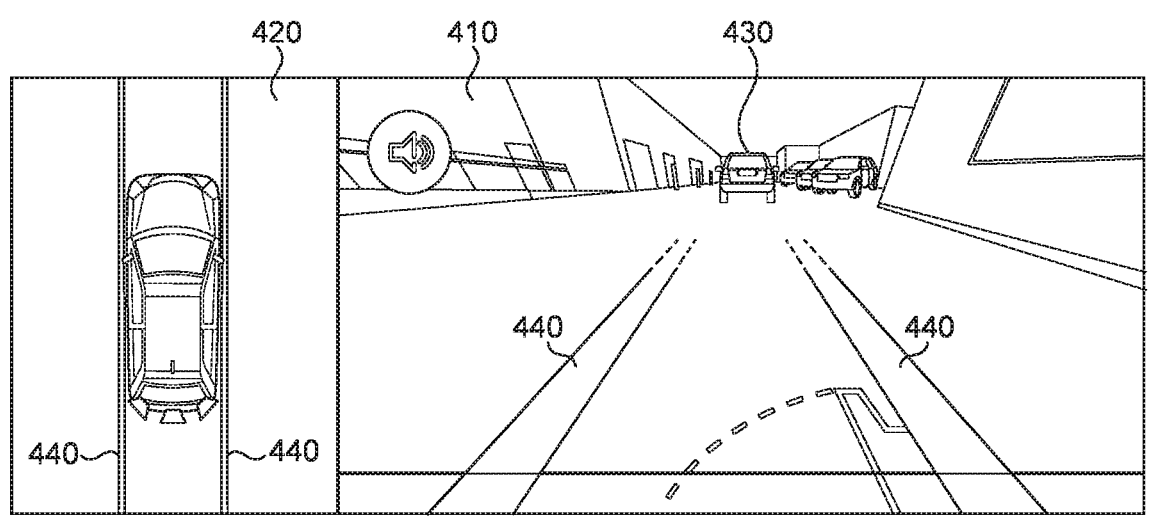
FIGS. 4a and 4b show parking aid displays of a vehicle according to the prior art.
Figure 4B:
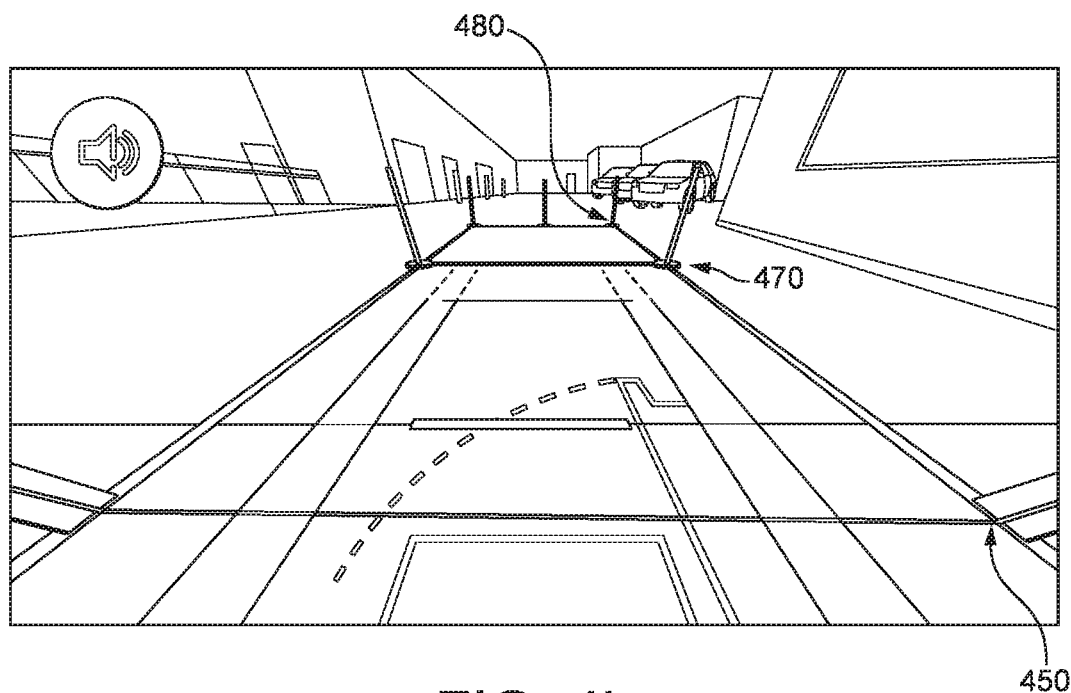

Referring to FIG. 4a, the parking aid display in FIG. 4a comprises a rear view image 410 and a top or aerial view image 420, whilst the parking aid display of FIG. 4b only comprises a rear view image. As shown in FIG. 4a, guide lines 440 are provided illustrating projected wheel tracks of the vehicle which follow a projected path of the vehicle and have a curvature dependent on a steering angle of the vehicle. The guide lines 440 enable a driver of the vehicle to appreciate the projected path of the vehicle. As can be seen in FIG. 4a, an object 430 in the form of a vehicle 430 is present in the image data. FIG. 4b illustrates a fish-eye nature of the image data where reference numeral 450 is a line indicative of approximately 0.3 m (1 ft), posts indicated as 470 are indicative of approximately 3 m (10 ft) and posts indicated as 480 are indicative of approximately 6 m (20 ft) from the rear of the vehicle. Thus it can be appreciated that visually estimating a distance from the vehicle using the rear view image may be difficult. As described above with reference to FIGS. 2 and 3, the vehicle 200, 300 may comprise the projection 230, 310 for which it is desired to leave a distance between the vehicle 200, 300 and an object when maneuvering. However since the extent of projection 230, 310 is not visible in the image data provided to the display 180, this task is made difficult. The extent of the projection 230 may not be visible due to one or both of a relative mounting location of the projection, such as the wheel 230, and the camera 220 not allowing the rearward extent of the wheel 230 to be visible in the image data from the camera 220, or because the projection is a moveable projection such as the door 310 and the vehicle 300 is being manoeuvred in the retracted configuration where it is desired to allow the distance 335 between the vehicle 300 and an object in order to configure the door in the extended configuration i.e. to open the door 310 when the vehicle is stopped.

Parking aid displays 600 700, 800 according to embodiments of the invention are shown in FIGS. 5 to 8. Parking aid displays according to embodiments of the invention comprise a graphical indication representing an extent of a projection 230, 310 from the vehicle 200, 300 into the environment external to the vehicle, where the extent of the projection is not visible in the image data forming the parking aid display. That is, by not visible, it is understood that a driver of the vehicle is not able to ascertain the extent or length of the projection from the parking aid display i.e. the extent of the projection is not shown. Parking aid displays according to embodiments of the present invention comprise an indication of one or more zones or regions, wherein each zone or region is associated with one or more projections 230, 310 from the vehicle 200, 300. The parking aid displays comprise a graphical indication of a zone or region dependent on a distance between the respective projection 230, 310 and an object in a vicinity of the vehicle as will be explained.

Figure 5A:
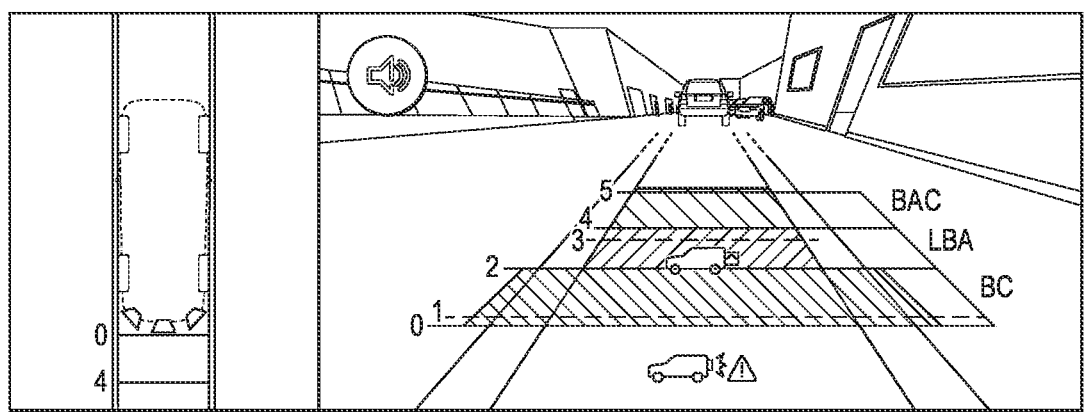
FIGS. 5a and 5b show an illustration of clearance zones associated with a vehicle according to an embodiment of the present invention.
Figure 5B:
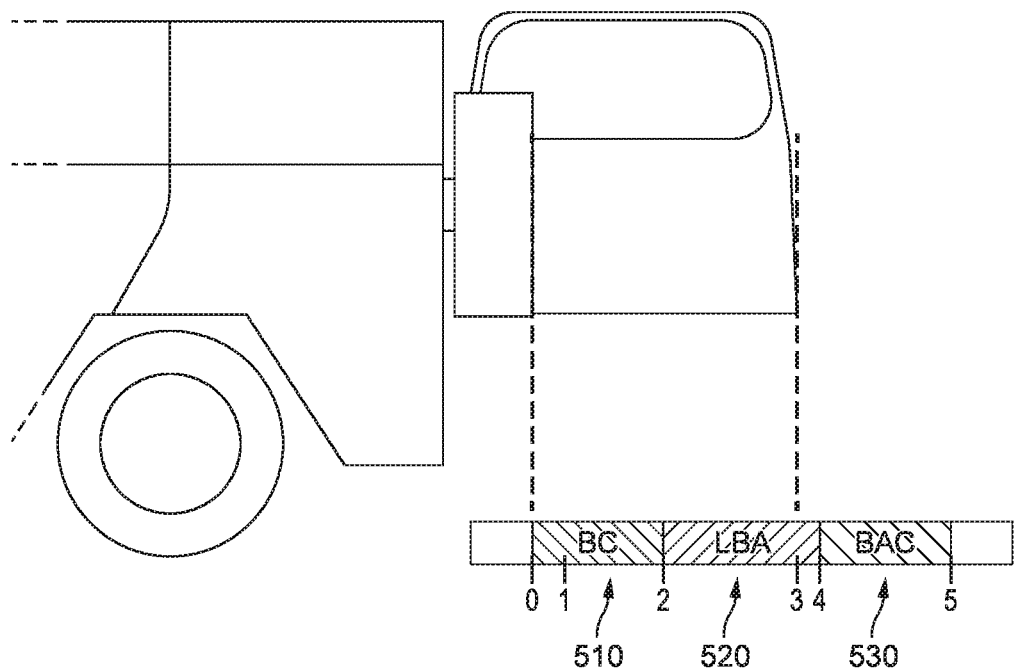

FIG. 5a illustrates a parking aid display 500 showing a number of regions and threshold distances, which are illustrated in relation to a rear of a vehicle having a plurality of projections, as shown in FIG. 5b. One of the projections in FIG. 5b is static whilst one of the projections is moveable and is shown in an extended or open position.

FIGS. 5a & 5b illustrate a line at a distance from the vehicle body, denoted as 0, which is a touch-point at a rear of the vehicle. For the illustrated vehicle, distance 0 corresponds to a plane 235 of an outermost point of the rear-mounted spare wheel 230 representing a projection from the vehicle. A threshold distance denoted as 1 in FIGS. 5a & 5b corresponds to a threshold distance at which embodiments of a parking aid system having an audible output may output a warning noise, such as a continuous tone. A threshold distance denoted by line 2 is a start (i.e. outer-most from the vehicle) of a region referred to as a bumper clearance (BC) region 510, between threshold distances 2 and 0. Although this region is referred to as the 'bumper' clearance region 510, it will be appreciated that this region is relevant to the distance of an object mounted at the rear of the vehicle, in the example the rear-mounted spare wheel 230 as illustrated. Thus the BC region 510 is associated with the static projection formed by the spare wheel 230. A threshold distance denoted as 3 relates to a physical extent of a moveable projection in the form of the door 310 from the vehicle. In the embodiment illustrated, a threshold distance denoted as 4 relates to a start of a region referred to as a Limited Boot Access (LBA) region 520. In the illustrated embodiment, the start 4 of the LBA region 520 is offset from the distance 3 of the physical extent of the door 310 by a safety margin i.e. between distances 3 & 4, although it will be appreciated that in some embodiments the start 4 of the LBA region 520 may be aligned with distance 3 without the safety margin. The LBA region 520 represents a region in which an object present in the region partially impedes opening the rear door 310 of the vehicle. A threshold distance 5 denotes a start of a Boot Access Clearance (BAC) region 530 between distances 4 & 5. The BAC region 530 is a region in which an indication of an object present within the BAC region 530 will be graphically provided to the driver of the vehicle, as will be explained.

Embodiments of the present invention comprise one or more graphical indicators, each graphical indicator representing the extent of the projection 230, 310 from the vehicle 200, 300 into the environment external to the vehicle 200, 300. The graphical indicators are provided to indicate the extent of the projection, wherein the extent of the projection 230, 310 is not visible in the image data provided to the parking aid display. By extent it is meant a distance from the vehicle. The parking aid displays of FIGS. 6-8 comprise rear-view images. However it will be realised that embodiments of the invention are not limited in this respect and that other views may be provided either alternatively or additionally, such as the parking aid display of FIG. 8 which comprises an aerial view. Embodiments of the invention are therefore contemplated in which one or both of a rear view and aerial view are provided which may comprise visual indications relating to one or more projections, embodiments of which will be explained below. Therefore it will be appreciated that the parking aid display according to an embodiment of the invention may comprise any viewpoint.

Figure 6:
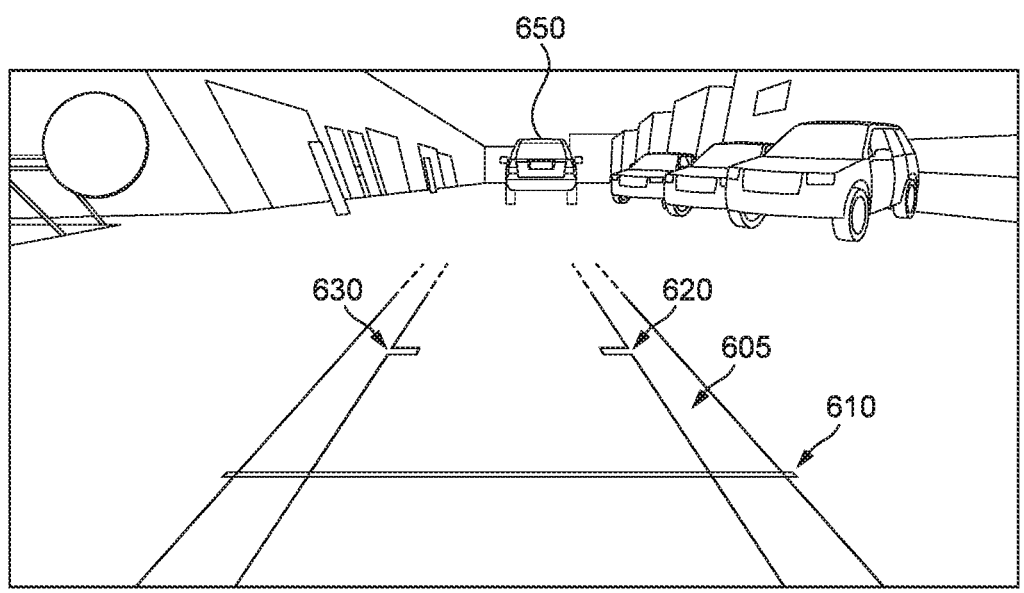
FIG. 6 shows a parking aid display according to an embodiment of the present invention.

The parking aid displays of FIGS. 6-8 may be provided by the system 100 illustrated in FIG. 1. The one or more cameras 160 provide image data 165 to the control system 110, wherein the processor 120 of the control system 110 is arranged to augment the received image data such that the control system 110 outputs augmented image data 185 to the display 180 to output a parking aid display 600, 700 800 according to an embodiment of the invention thereon. By augmented image data it is meant that one or more pixels of the received image data 165 are modified, such as in colour and/or brightness, such that the augmented image data 185 provided to the display comprises one or more graphical indicators such as marks, lines or indicated regions representing graphical indicators as will be explained.

Each of the parking aid displays 600 700, 800 according to some embodiments of the invention comprises each a graphical indicator 610, 710, 810 representing the extent of a projection 230, 310 from the vehicle 200, 300 into the environment external to the vehicle 200, 300. In the illustrated embodiments, at least some of the graphical indicators 610, 710, 810 are arranged generally perpendicular to at least one indication 605 of a path of the vehicle 200, 300. The indication of the path of the vehicle may extend from a longitudinal axis of the vehicle 200, 300. The indication of the path of the vehicle 200, 300 is provided in some embodiments by one or more guide lines 605, indicated in FIG. 6, corresponding to the projected path of the vehicle 200, 300. The parking aid displays 600 700, 800 shown in in FIGS. 6-8 comprise a plurality of indicators 610, 620, 630, 710, 720, 810, each representing the extent of a respective projection 230, 310 from the vehicle 200, 300. In the illustrated embodiments, a first indicator 610, 710, 810 corresponds to an extent 235 of a first projection 230 and a second indicator 620, 630, 720, 820 may represent an extent 335 of a second projection 310 from the vehicle 300. In the examples of FIGS. 2 and 3, the first projection is the extent of the rear-mounted wheel 230 and the second projection 310 corresponds to an extent of a moveable projection in the form of the door 310 of the vehicle 300. However it will be appreciated, as discussed above, that other projections may be envisaged. The indicator 620, 630 may be indicative of the extent of the moveable projection 310, which projects from the vehicle 300, in the retracted position. The graphical indicator 620, 630 may be indicative of the extent of the moveable projection 310 in the extended position, such as the door 310 open extent. It will be appreciated that two indicators may be provided simultaneously indicative of the extent of one projection in both the retracted and extended positions.

In the Figures, the first indicator 610, 710, 810 is in the form of a line between the guide lines 605, although it will be appreciated that other representations may be used. The second indicator 620, 630 may be a dynamic indicator 620 which changes one or more graphical attributes in dependence on a distance to an object. In the example, the indicator may change between marks 620, 630 illustrated in FIG. 6 at each side of the vehicle's track or path and an indication, such as a line 720 or visually indicated region 730, such as an indication of the BAC region 530, in dependence on a distance of an object in a direction of travel of the vehicle, as will be described. One or both of the first and second indicators 610, 620, 630, 710, 720 810, may be graphically dynamic in appearance. The first and second indicators 610, 620, 630, 710, 720, 810, may change in appearance in dependence on a distance between the vehicle 200, 300 and an object 650 which is another vehicle 650 in FIGS. 6-8. It will be appreciated that other graphical indicators may be used. In some embodiments of the invention, a distance between an object and a projection from the vehicle 200, 300 is graphically indicated. In some embodiments, an indication of one of a plurality of regions with respect to the vehicle 200, 300 in which the object is located is provided by the parking aid display 600, 700, 800x.

Figure 7A:
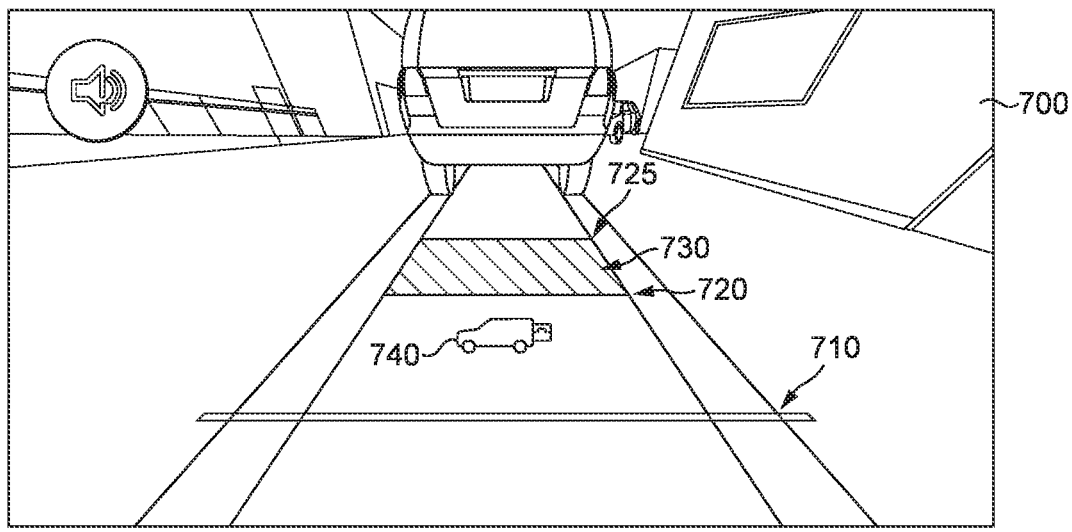
FIGS. 7a, 7b, and 7c show a further parking aid display according to an embodiment of the present invention.
Figure 7B:
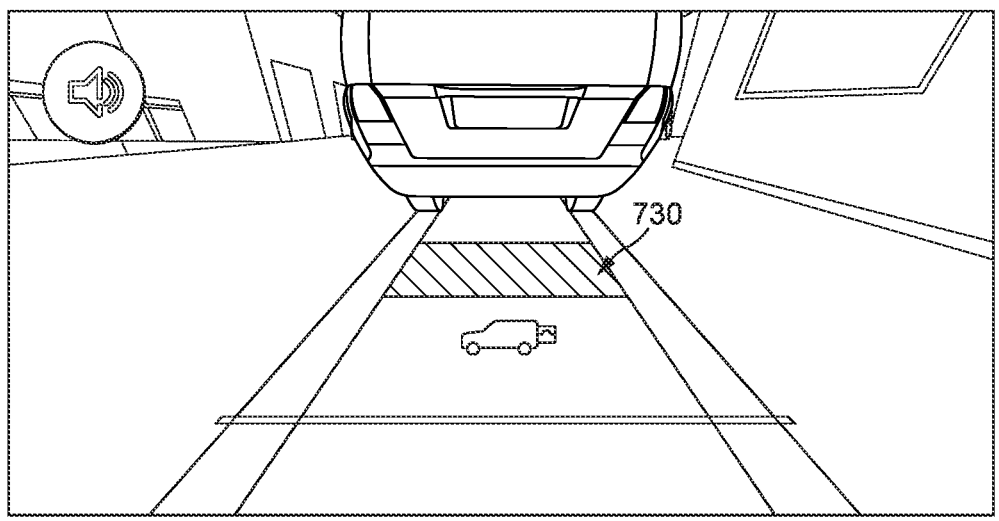
Figure 7C:
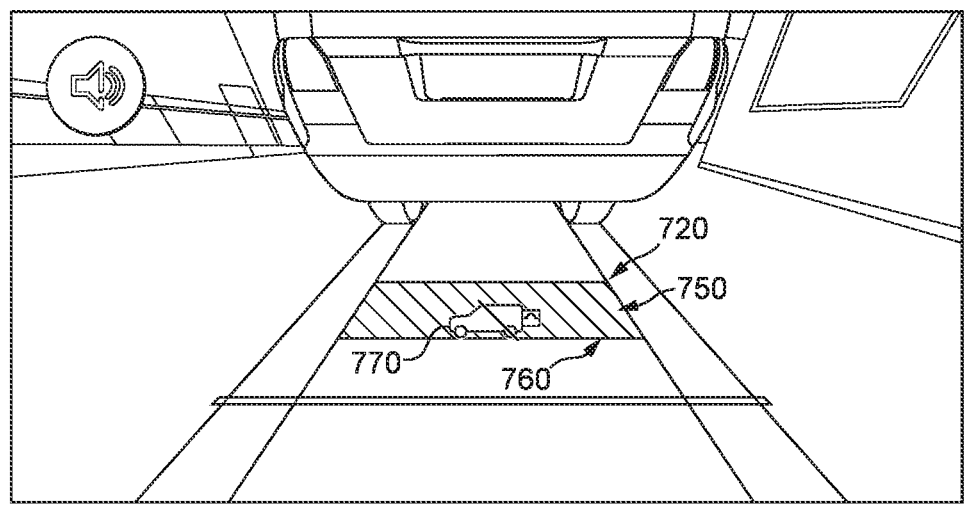

The control system 110 is arranged to receive distance data 175 indicative of a distance between the vehicle 200, 300 and the object 650 in the environment external to the vehicle 200, 300. In FIG. 6, the object 650 is a relatively long distance from the vehicle 200, 300 having the control system 110 and parking aid display 180 i.e. the host vehicle. In FIGS. 7a, 7b the host vehicle is approaching the object 650 i.e. closer than in FIG. 6. In FIG. 7 the host vehicle is approaching, but not yet at, an extent or distance corresponding to the second graphical indicator 620, 630, 720, 820. In FIGS. 7c & 8, the host vehicle is closer to the object 650 than the second graphical indicator 620, 630, 720 In embodiments of the invention, one or more of the graphical indicators have one or more attributes indicative of the distance between the vehicle 200, 300 and the object 650. In particular, in embodiments of the invention, one or more of the graphical indicators 610, 620, 710, 720, 810, have one or more graphical attributes indicative of the distance between the extent of the corresponding projection and the object 650. It will be appreciated that graphical indicators 620, 630, 720, 820 may also be provided on an aerial view generated with respect to the host vehicle 200, 300. At least some of the graphical indicators 620, 630, 720, 820 in the aerial view may be dynamic in appearance.

As shown in FIGS. 6, 7 and 8, the one or more attributes of the graphical indicators comprise, in some embodiments, a highlighting or shading 730, 840, although it will be appreciated that other graphical indicators may be used. The graphical indicator may indicate a region 510, 520, 530 associated with a respective projection from the vehicle 200, 300 in which an object is located. The graphical indicator may indicate one of a plurality of regions 510, 520, 530 in a vicinity of the vehicle in which the object 650 is located.

In FIG. 6, the host vehicle is sufficiently far away from the object 650, which is in the form of the other vehicle 650. In FIG. 6, the parking aid display comprises an indication 605 of the path of the vehicle 200, 300. Furthermore, the extent of one or more projections 230, 310 from the vehicle 200, 300 is graphically indicated 610, 620.

In FIG. 7a, the host vehicle has moved (in comparison to FIG. 6) toward the object 650 such that the object 650 is present within the BAC region 530 shown in FIG. 5. The BAC region is graphically indicated in FIGS. 7a, 7b as the BAC region 730. In FIGS. 7a, 7b the BAC region 730 is graphically indicated in the parking view 700 by highlighting of the BAC region 730. The indicated BAC region 730 in FIGS. 7a, 7b extends toward the host vehicle from the threshold distance 5 corresponding to the start of the BAC region 530 shown in FIG. 5 and denoted as 725 in FIG. 7a to the threshold distance 4, denoted as 720 in FIGS. 7a & 7b. The BAC region 730 is indicated in the parking aid display 700 of FIG. 7a with a first graphical attribute which may be a first highlighting. The first highlighting may be relatively transparent or have a first brightness, or colour for example. The first transparency may be relatively transparent, or the first brightness may be relatively low, indicative of the object being further away from the vehicle than the extent of the moveable projection formed by the door 310, at least in comparison to the BAC region 730 in FIG. 7b. In FIG. 7, the indication of the BAC region 730 is provided in a first colour, such as orange, to indicate a relative distance of the object 650 from the host vehicle. The indicated regions in embodiments of the invention are illustrated as generally rectangular regions defined between the guidelines 605 and first and second distances from the vehicle. It will be appreciated that the regions may be otherwise shaped, such as curved or arcuate, with a distance of the region from the vehicle being indicate of the extent of the respective projection.

The parking aid display 700 of FIG. 7a is provided to convey an indication to the driver of the host vehicle that a projection from the host vehicle is approaching the object 650. In FIG. 7a the projection is the extent of the moveable projection corresponding to the door 310. As discussed above in relation to FIG. 5, the threshold distance 4 corresponding to line 720 is offset from the physical extent of the door opening by a safety margin between distances 3 and 4 shown in FIG. 5, although it will be realised that line 720 may correspond to the extent of the physical projection of the door 310 i.e. without the safety margin.

The parking aid display 700 of FIGS. 7a & 7b comprises an icon 740 or graphical element 740 indicating the nature or type of projection. In the illustrated example, the icon 740 indicates that the projection is the door 310. In some embodiments, the icon is a first icon 740. The first icon 740 indicates that the object does not impede the projection i.e. that it is possible to open the door 310.

In FIG. 7b, the host vehicle has moved closer to the object 650 than in FIG. 7a, such that the object 650 is approaching a proximal end of the BAC region 530, 730. In the example, the object 650 is generally at the distance 4 of line 720 which corresponds to the second graphical indicator indicated the proximal end of the BAC region 730. At the position of the host vehicle illustrated in FIG. 7b, the rear door 310 of the host vehicle is still able to open. In order to alert the driver of the host vehicle to the object 650 being generally at the proximal end of the BAC region 530, 730 the region 730 is indicated with a second graphical attribute in FIG. 7b which may be a second highlighting of the BAC region 730. The second highlighting may be less transparent or have a second brightness or colour, in comparison to FIG. 7a, so as to display the BAC region 730 more prominently in the parking aid display 700. The increased prominence of the BAC region 730 in FIG. 7b is to advantageously alert the driver to the proximity of the object 650 to the extent of the moveable projection when in the open or extended position i.e. when the rear door 310 is open.

In FIG. 7c the host vehicle has moved still closer to the object 650 than in FIG. 7b, such that the host vehicle is closer to the object 650 than the distance 4 of line 720 which corresponds to the second graphical indicator. That is, the object 650 is now present within the LBA region 520 shown in FIG. 5. Thus the parking aid display of FIG. 7c comprises a graphical indication of the LBA region 520, 750. The parking aid display of FIG. 7c comprises an indication of threshold distance 4, as line 720 marking a start of the LBA region 520, 750 and an indication 760 of an end of the LBA region 520, 750 proximal to the host vehicle. A second icon 770 is displayed in the parking aid display of FIG. 7c indicative the object impeding movement of the moveable projection i.e. it being only possible to partially open the door 310 of the vehicle. As in FIG. 7b, in some embodiments, the position of the object 650 within the LBA region 520, 750 may be indicated by one or more graphical attributes of the LBA region 520, 750 such as transparency, brightness or colour.

Figure 8A:
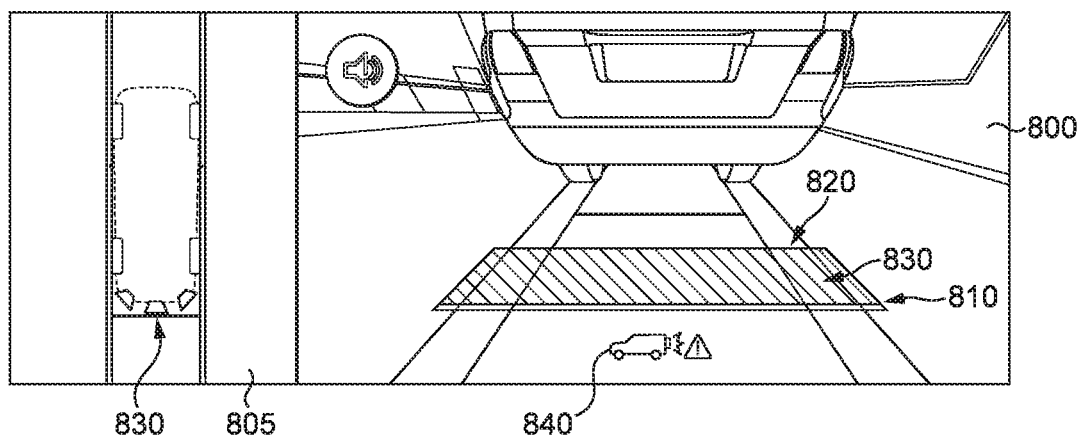

In FIGS. 8a & 8b, the host vehicle has moved closer to the object 650 than in FIG. 7, such that the object 650 is a distance from the host vehicle corresponding to within the BC region 510. An indication of the BC region 510, 830 is provided the parking aid display 800 of FIG. 8a. The parking aid display 800 comprises a graphical indicator 820 indicating the start of the BC region 510, 830, corresponding to threshold distance 2 in FIG. 5 and an end 820 of the BC region 510, 830 corresponding to threshold distance 0 in FIG. 5. The graphical indicator of the BC region 830 in FIGS. 8a & 8b may be provided in a second colour, such as red, to indicate proximity of the object 650 to the host vehicle. In FIG. 8b, as compared to FIG. 8a, the vehicle has moved still closer to the object 650 and the augmentation or highlighting of the BC region 510, 830 is changed in transparency to indicate the proximity to the object in FIG. 8b. In FIG. 8b, the object 650 is at a proximal end of the BC region 510, 830 closest to the host vehicle and the BC region augmentation is substantially solid as compared to the partially transparent indication of FIG. 8a.

The example parking aid display 800 of FIGS. 8a & 8b comprises an aerial view 805, with it being appreciated that the parking aid display of FIG. 7 may also comprise an aerial view. The aerial view 805 may comprise any of the indications provided in the rear view of FIGS. 8a 8b. In the example, a graphical indication of the threshold distance 810 is provided with it being appreciated that this is not restrictive.

Figure 9:
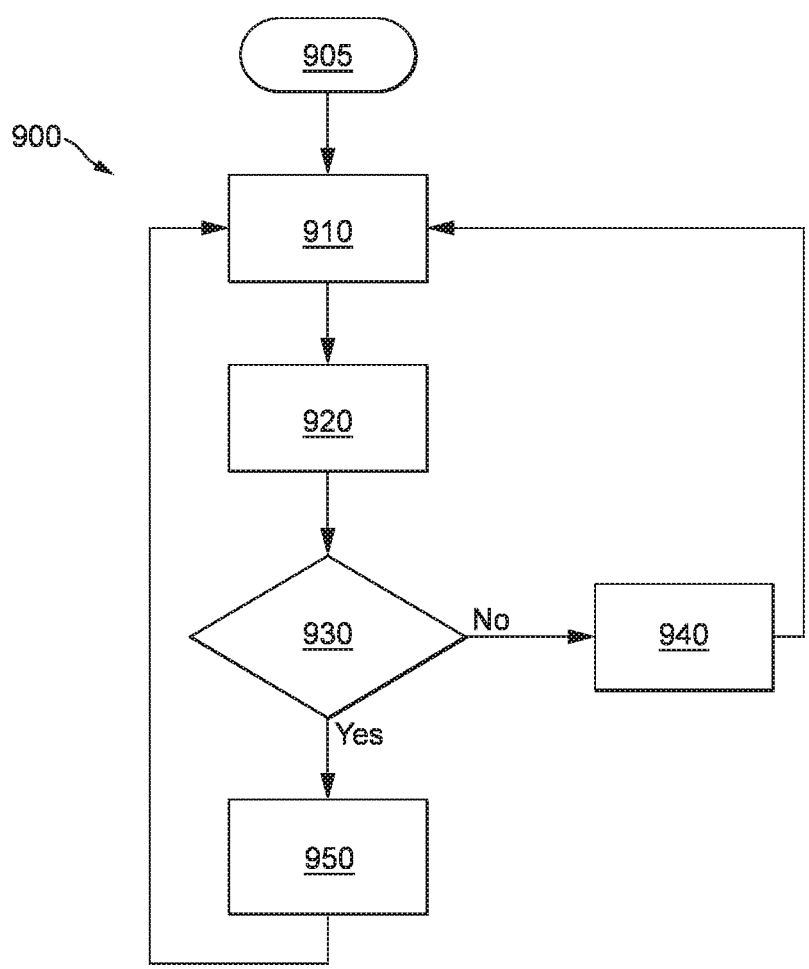
FIG. 9 shows a method according to an embodiment of the present invention.

A method 900 according to an embodiment of the invention will be described with reference to FIG. 9. The method 900 is a method 900 of providing a parking aid display 600, 700 800 according to an embodiment of the invention, such as those shown in FIGS. 6-8 and described above. The method 900 may be implemented by the system 100 shown in FIG. 1 and described above.

In an example, the method starts at block 905 and comprises a block 910 of receiving image data 165. The image data 165 is received from one or more cameras 160 associated with the vehicle. The image data 165 is received at the input 140 of the control system 110.

The method, in some embodiments, comprises a block 920 of receiving distance data 175. The distance data 175 is received from one or more sensor devices 170, such as ultrasonic sensors 170, associated with the vehicle. The distance data 175 is indicative of a distance between the vehicle, usually at a point of the devices 170, and any objects in a vicinity of the vehicle. From the distance data 175, the distance between one or more projections 230 or moveable projections 310 in either an extended or retracted position, from the vehicle 200, 300 and the respective objects can be determined, such as by the processor 120. The distance data 175 is received at the input 140 of the control system 110.

In step 930 it is determined whether the distance between the vehicle 200, 300 and an object 650 is less than a predetermined threshold, such as the second extent threshold discussed above. If the distance is greater than the threshold i.e. the object 650 is further away, the method moves to block 940. If, however, the object 650 is less than or equal to the distance of the threshold, the method 900 moves to block 950.

In some embodiments of step 930, the threshold distance may correspond to the threshold distance denoted as 5 in FIG. 5. That it, step 930 may comprise determining whether the object 650 is closer to the vehicle that the start of the BAC region 530. If the object is closer than the start of the BAC region 530, the method 900 moves to step 950.

In block 940 the image data is augmented with one or more graphical indicators corresponding to the extent of a respective one or more projections 230, 310 from the vehicle 200, 300 into the environment external to the vehicle 200, 300. As discussed above, the extent of the one or more projections are not visible in the image data, thus the parking aid display provides the graphical indicators to assist the driver of the vehicle 200, 300. For example in FIG. 6, the image data is augmented with one or both of the first indicator 610 and the second indicator 620 in step 940.

In block 950, the image data is augmented with a graphical indicator and an indication of a distance of the object 650. For example, in FIG. 7 the second indicator 720 is changed to be displayed as a continuous line between the guide lines 605. In some embodiments, in step 950 the indication is provided as one or both of highlighting 730 of a region corresponding to the location of the object 650 and display of an icon 740, 770 corresponding to distance of the object 650.

In some embodiments step 950 comprises determining in which of a plurality of regions 510, 520, 530 proximal to the vehicle the object 650 is located. In the illustrated embodiment, step 950 may comprise determining whether the object 650 is located in one of the BAC region 530, the LBA region 520 or the BC region 510 in dependence on a distance of the object 650 from the vehicle 200, 300. In step 950 the parking aid display is augmented with a graphical indication 730, 750, 810 corresponding to the region 530, 520, 510 in which the object 650 is located. Furthermore, in some embodiments of step 950 the method comprises determining one or more graphical attributes of the indication such as one or more of a brightness, transparency or colour of the indication in dependence on the distance of the object 650. For example, as described above, the transparency or brightness of the indication of the region 730 in FIGS. 7a & 7b is controlled in dependence on the position of the object 650 within the BAC region 530, 730. Similarly, in FIGS. 7 and 8 the colour of the indicated regions is controlled in dependence on the distance.

It will be appreciated that steps 930-950 may be performed for each respective indicator 610, 720 being associated with a different distance threshold such that some of the indicators have a distance indicator whilst others, which may be closer to the vehicle, do not.

After blocks 940, 950 the method may return to block 910 to repeat and provide a continuously updated parking aid display 600, 700 800.

It will be appreciated that various changes and modifications can be made to the present invention without departing from the scope of the present application.

The invention claimed is:

1. A control system for a vehicle, the control system comprising one or more controllers, the one or more controllers comprising:

an electrical input arranged to receive image data from a single imaging device associated with the vehicle and distance data from at least one distance measuring device associated with the vehicle, the image data indicative of an environment external to the vehicle, and the distance data indicative of a distance between the vehicle and an object in the environment external to the vehicle;

a processor arranged to:
generate one or more graphical indicators, each graphical indicator representing an extent of a projection from the vehicle into the environment external to the vehicle, wherein the extent of the projection is not visible in the image data;
generate at least one of the one or more graphical indicators indicative of the distance between the extent of the projection and the object;
generate the one or more graphical indicators having one or more attributes indicative of the distance between the extent of the projection and the object; and
selectively indicate one or more of a plurality of predetermined regions, each region being associated with a respective projection, based at least in part on the distance between the extent of the projection and the object, wherein the selective indication comprises a highlighting applied to a portion of the image data corresponding to the one or more of the plurality of predetermined regions, and further wherein one or more attributes of the highlighting includes one or more of a transparency or a color associated with the one or more graphical indicators; and an electrical output arranged to output augmented image data comprising the image data and data indicative of the one or more graphical indicators representing the extent of the projection from the current position of the vehicle into the environment external to the vehicle for display on a display device.

2. A control system according to claim 1, wherein the projection is a moveable projection moveable between a retracted position and an extended position.

3. A control system according to claim 2, wherein the graphical indicator is indicative of the extent of the moveable projection in one or both of the retracted position and the extended position.

4. A control system according to claim 2, wherein the moveable projection is an aperture closing member for closing an aperture of the vehicle in the retracted position.

5. A control system according to claim 1, wherein each graphical indicator is arranged generally perpendicular to at least one indication of a path of the vehicle.

6. A system for a vehicle, comprising:
the control system according to claim 1;
the single imaging device for outputting the image data to the control system;
the at least one distance measuring device for outputting the distance data to the control system; and
a display device for outputting thereon the augmented image data from the control system.

7. The control system of claim 1, wherein the at least one distance measuring device comprises at least one selected from the group consisting of: ultrasonic devices and radar devices.

8. A vehicle comprising the control system according to claim 1.

9. A control system according to claim 1, wherein the single imaging device is a camera positioned at the rear of the vehicle.

10. A computer-implemented method, comprising:
- receiving image data from a single imaging device associated with a vehicle, the image data indicative of an environment external to the vehicle;
- receiving distance data from at least one distance measuring device associated with the vehicle, the distance data indicative of a distance between the vehicle and an object in the environment external to the vehicle;
- generating one or more graphical indicators, each graphical indicator representing an extent of a projection from the vehicle, wherein the extent of the projection is not visible in the image data;
- displaying on a display device augmented image data comprising the image data and the one or more graphical indicators representing the extent of the projection from the current position of the vehicle into the environment external to the vehicle; and
- selectively indicating one or more of a plurality of predetermined regions, each region being associated with a respective projection, based at least in part on the distance between the extent of the projection and the object, wherein the selective indication comprises a highlighting applied to a portion of the image data corresponding to the one or more of the plurality of predetermined regions, and further wherein one or more attributes of the highlighting includes one or more of a transparency or a color associated with the one or more graphical indicators.

11. The method of claim 10, further comprising:
- displaying at least one of the one or more graphical indicators indicative of the distance between the extent of the projection and the object.

12. The method of claim 10, wherein each graphical indicator is arranged generally perpendicular to at least one indication of a path of the vehicle.

13. Computer software stored on a tangible, non-transitory computer-readable medium which, when executed by a computer, is arranged to perform the method according to claim 10.

* * * * *